United States Patent [19]
Nakamura

[11] Patent Number: 5,313,658
[45] Date of Patent: May 17, 1994

[54] TRANSMISSION POWER CONTROL SYSTEM IN A RADIO APPARATUS

[75] Inventor: Hideki Nakamura, Ohtawara, Japan

[73] Assignee: Fujitsu Limited, Kawasaki, Japan

[21] Appl. No.: 997,639

[22] Filed: Dec. 28, 1992

Related U.S. Application Data

[63] Continuation of Ser. No. 495,985, Mar. 20, 1990, abandoned.

[30] Foreign Application Priority Data

Apr. 30, 1989 [JP] Japan ................... 1-067849

[51] Int. Cl.$^5$ ............................................. H04B 1/04
[52] U.S. Cl. ..................... 455/69; 455/126; 455/127
[58] Field of Search ............. 455/12.1, 69, 127, 249.1, 455/343, 115, 126

[56] References Cited

U.S. PATENT DOCUMENTS 3,745,464  7/1073  Lee .
4,004,224  1/1977  Arens et al. .
4,553,105  11/1985 Sasaki .................... 455/249

FOREIGN PATENT DOCUMENTS 0115139  8/1984  European Pat. Off. .
0230691  5/1987  France .

Primary Examiner—Reinhard J. Eisenzopf
Assistant Examiner—Chi Pham
Attorney, Agent, or Firm—Staas & Halsey

[57] ABSTRACT

A transmission power control system for use in a radio includes a transmission unit having a first variable attenuator for adjusting an intermediate frequency signal level, a converter for converting the output of the first variable attenuator to a higher frequency band signal, a second variable attenuator for adjusting the output level of the converter, and a high output amplifier for amplifying the output of the second variable attenuator to provide an amplified signal to a transmission antenna. The transmission unit also includes a first transmission power controller for controlling transmission power based on the degree of attenuation of the first variable attenuator, and a second transmission power controller for controlling the transmission power based on the degree of attenuation of the second variable attenuator. The first transmission power controller or the second transmission power controller is activated by a switch based on the range of a receiving level data signal.

11 Claims, 11 Drawing Sheets

TRANSMISSION POWER CONTROL SYSTEM IN A RADIO APPARATUS

This application is a continuation of application Ser. No. 07/495,985, filed Mar. 20, 1990, now abandoned.

BACKGROUND OF THE INVENTION

The present invention relates to a transmission power control system in a radio apparatus for controlling transmission power on the transmission side of a radio communication system.

Generally speaking, in a radio communication system for transmitting signals in free space, there is a possibility that the radio communication state will deteriorate due to fading caused in a space or due to interference from other radio communication systems. Therefore, when the propagation state is good, the transmission power is lowered to decrease interference with other systems. However, when the propagation state is bad, the transmission power is raised. Therefore, without causing an interference, the fading problem is solved and the transmission power is controlled in accordance with a receiving level data signal.

FIG. 1 shows a block diagram of the transmission power control system in a general wireless apparatus. The system comprises a transmitter 1 (transmitting unit), a transmission antenna 2 for transmitting a transmission signal from transmitter 1, a receiving antenna 3 for receiving a signal from transmission antenna 2, a receiver 4 (receiving side), a level detecting process circuit 5 for detecting the receiving level of the receiver 4 and for transmitting the receiving level to the transmission side, and a transmission control circuit 6 for receiving receiving level information from the level detecting process circuit 5 and for controlling the transmission power of the transmitter 1.

Next, transmitter 1 and a conventional transmission power control system will be explained in detail by referring to the first prior art example shown in FIG. 2. Transmitter 1 comprises a variable attenuator (VATT) 1a for adjusting an intermediate wave (IF) signal level, a distortion compensator (PD) 1b for compensating the distortion of the output of the high output amplifier 1e, an up-converter 1c for converting the output of the distortion compensator 1b to a signal of higher frequency, a high power amplifier (HPA) 1e, as mentioned above, for amplifying the output of up-converter 1c and outputting it to transmission antenna 2, and local oscillator 1f for an up-converter.

Transmission control circuit 6 controls the transmission power by controlling variable attenuator 1a based on a detection signal having an output level obtained from high output amplifier 1e and based on receiving level information obtained from a level detecting process circuit 5. However, the transmission power control system shown in FIG. 2 may sometime produce distortion because the level relation between distortion compensator 1b and high power amplifier 1e changes when the gain change of the high output amplifier 1e is corrected by the intermediate frequency signal side.

Another prior art transmission power control apparatus is shown in FIG. 3. In the second prior art shown in FIG. 3 a second variable attenuator 1d (when attenuator 1a is called the first variable attenuator) is inserted between up-converter 1c and high output amplifier 1e. The second variable attenuator 1b is controlled by comparator 6a. Comparator 6a receives a detecting signal with output level information obtained from high output amplifier 1e and a previously set reference voltage, and then controls the second variable attenuator 1d based on the difference between the detecting signal and a reference voltage. The apparatus forms a transmission control unit by using transmission control circuit 6, which is the same as the apparatus shown in FIG. 2, and the above-described comparator 6a.

With this structure, the transmission power determined by the receiving level information is controlled by the first variable attenuator 1a and the gain variable portion of high output amplifier 1e is corrected by the second variable attenuator 1d.

However, the prior art transmission power control system shown in FIG. 3 comprises a controlling system with a double loop structure, which makes the structure and control complicated.

SUMMARY OF THE INVENTION

An object of the present invention is to realize a highly reliable transmission power control system which simply controls two variable attenuators.

A feature of the present invention resides in a transmission power control system for use in a radio apparatus comprising a transmission unit, said transmission unit comprising a first variable attenuator means for adjusting an intermediate frequency signal level, a converter means for converting the output of said first variable attenuator to a higher frequency band signal, a second variable attenuator means for adjusting the output level of said converter means, a high output amplifier means for amplifying the output of said second variable attenuator to provide an amplified signal which is outputted to a transmission antenna, a first transmission power control means for controlling transmission power based or the degree of attenuation of said first variable attenuator means, a second transmission power control means for controlling the transmission power based on the degree of attenuation of said second variable attenuator means, and switching means for making effective either said first transmission power control means or said second transmission power control means in accordance with the range of a receiving level data signal.

DESCRIPTION OF THE PREFERRED EMBODIMENTS

Figure 4:
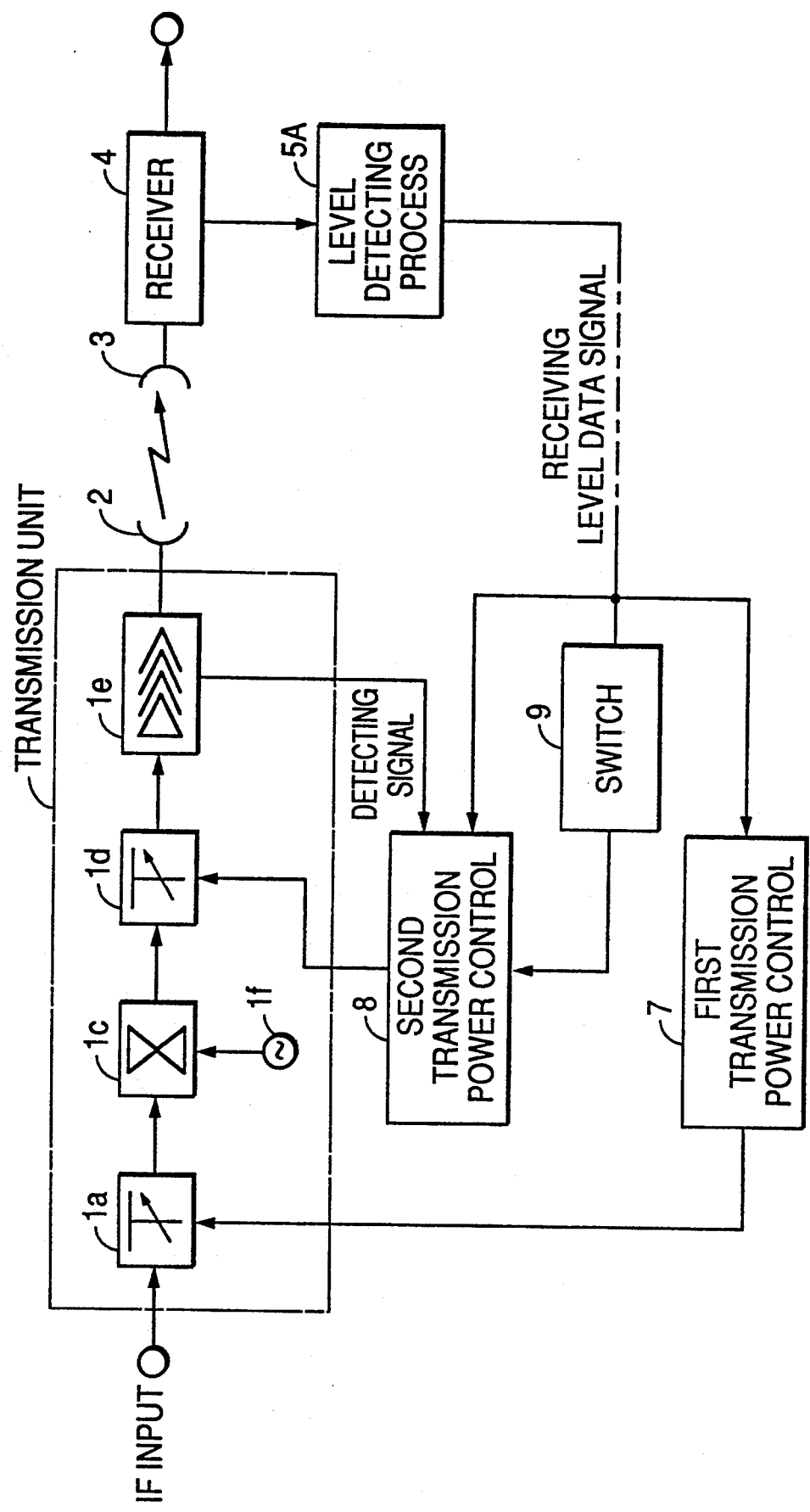
FIG. 4 is a block diagram showing the principle of the present invention.

FIG. 4 shows a block diagram of the principle of the present invention. In FIG. 4, transmission unit includes comprising a variable attenuator $1a$ for adjusting an intermediate frequency (IF) signal level, an up-converter $1c$ for converting the output of the first variable attenuator $1a$ to a signal of higher frequency band, a second variable attenuator $1d$ for adjusting the output level of up-converter $1c$, a high output amplifier (HPA) $1e$ for amplifying the output of the second attenuation variable attenuator $1d$ and for outputting it to transmission antenna 2, and a local oscillator $1f$ for an up-converter; 3 is a receiving antenna for receiving a signal from transmission antenna 2; 4 is a receiver (on the receiving side); and 5A is a level detecting process circuit for detecting the receiving level of the receiver 4 and for transmitting the signal to the transmission side.

Figure 5:
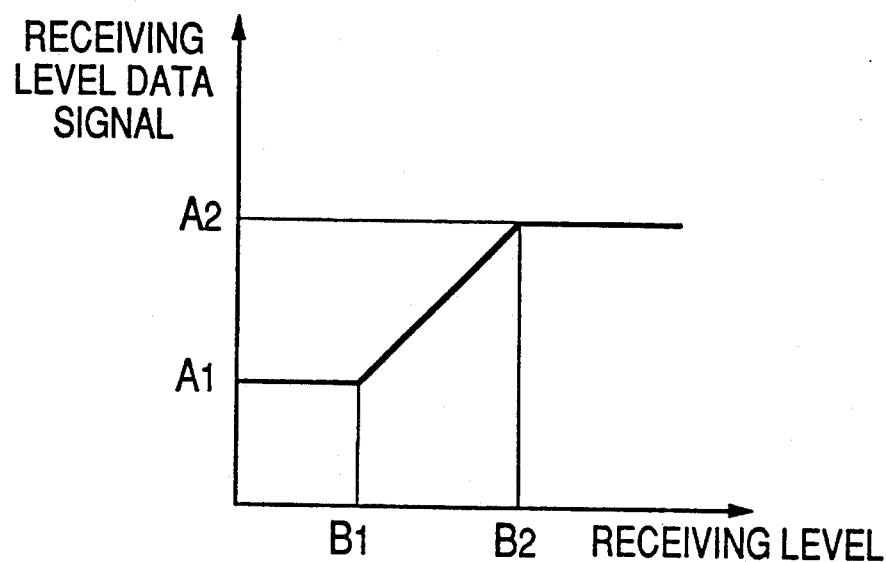
FIG. 5 shows the characteristic of the receiving level data signal according to the present invention.

In the present invention, level detecting process circuit 5A performs a receiving level detection function as in the prior art, and a receiving level clipping function as shown in FIG. 5. The receiving level clipping function clips receiving level information to a first constant value A1 in a scope in which the receiving level is lower than the first predetermined value B1. It further clips the receiving level information to a second constant value A2 (>A1) in a scope in which a receiving level is more than the second predetermined value B2 (>B1). The value varying along connecting the constant values A1 and A2 is output when the receiving level is between the predetermined values B1 and B2.

A first transmission power control unit 7 controls transmission power by controlling first variable attenuator $1a$ based on the receiving level data signal from level detecting process circuit 5A, and a second transmission power control unit 8 controls a transmission power by controlling the second variable attenuator $1d$. The second transmission power control unit 8 receives a detecting signal having output level information provided from high output amplifier $1e$ and a receiving level data signal as reference signal from level detecting process circuit 5A, and then controls the second variable attenuator $1d$ based on the difference between the detecting signal and receiving level data signal.

A switch unit 9 receives a receiving level data signal from level detecting process circuit 5A, and makes the output of the second transmission power control unit 8 a constant value where the receiving level data signal is within a range between values A1 and A2 (the receiving level is between the predetermined values B1 and B2). This, a transmission power control is performed by the first transmission power control unit 7 only. On the other hand, where the receiving level is less than predetermined value B1 or more than predetermined value B2, i.e., when the receiving level data signal is the constant value A1 or the constant value A2, switching means 9 performs a switching operation so that power transmission control is conducted by the second transmission power control unit.

According to the present invention with the above structure, when a receiving level data signal having receiving level information from receiver 4 and the upper and lower values clipped based on the characteristic shown in FIG. 5 is transmitted to the transmission side, switch unit 9 determines whether or not it is a constant value A1 or A2, or between A1 and A2.

Where the receiving level data signal is between values A1 and A2, switch unit 9 maintains the output of the second transmission power control unit 8 constant, the transmission power control being performed by the first power transmission power control unit 7. The first transmission control power control unit 7 controls the power of the transmission unit by controlling the first variable attenuator $1a$ based on the receiving level signal during the period in which the receiving level data signal changes along the continuous line connecting the first constant value A1 with second constant value A2.

On the other hand, where the receiving level data signal is at the clipped constant value A1 or A2, switch unit 9 activates the second transmission power control unit 8. Second transmission power control unit 8 controls the power of the transmission unit by controlling the second variable attenuator $1d$, based on the difference between the detecting signal having the output level information from high output amplifier $1e$ and the receiving level data signal of the constant value A1 or A2 as the reference signal. The first transmission power control unit 7 receives the receiving level data signal of the constant value A1 or A2, controls the first variable attenuator $1a$ based on these values, and maintains the transmission power at a constant value in accordance with the receiving level data signal.

Figure 1:
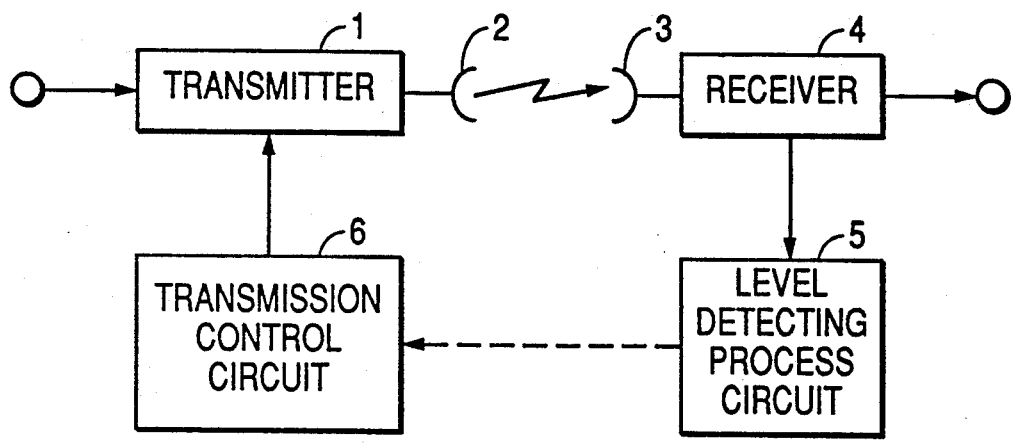
FIG. 1 is a block diagram for showing a transmission power control system of a general radio apparatus.
Figure 2:
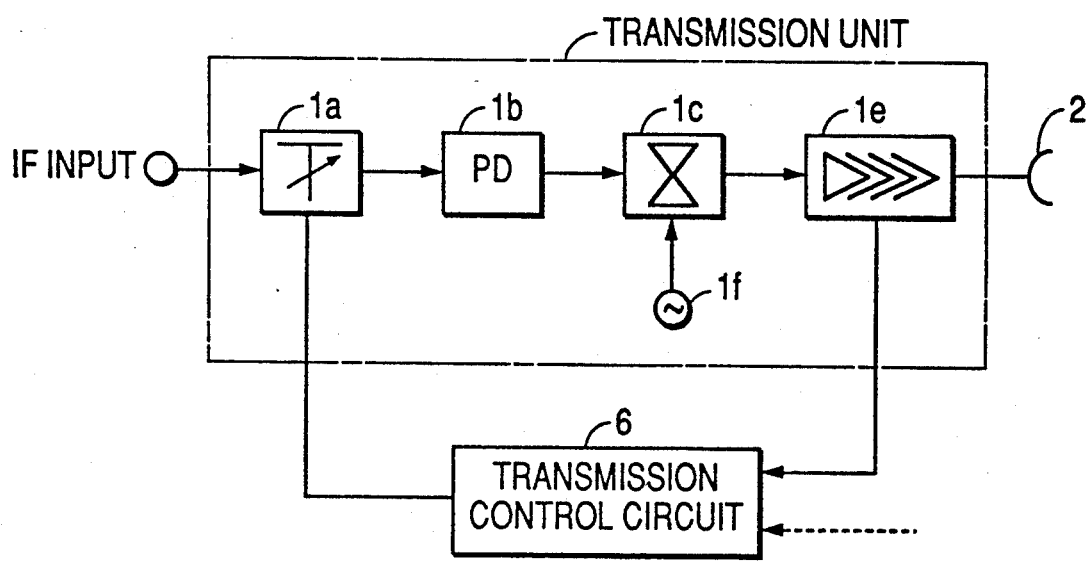
FIG. 2 is a block diagram of a first prior art transmission power control apparatus.
Figure 3:
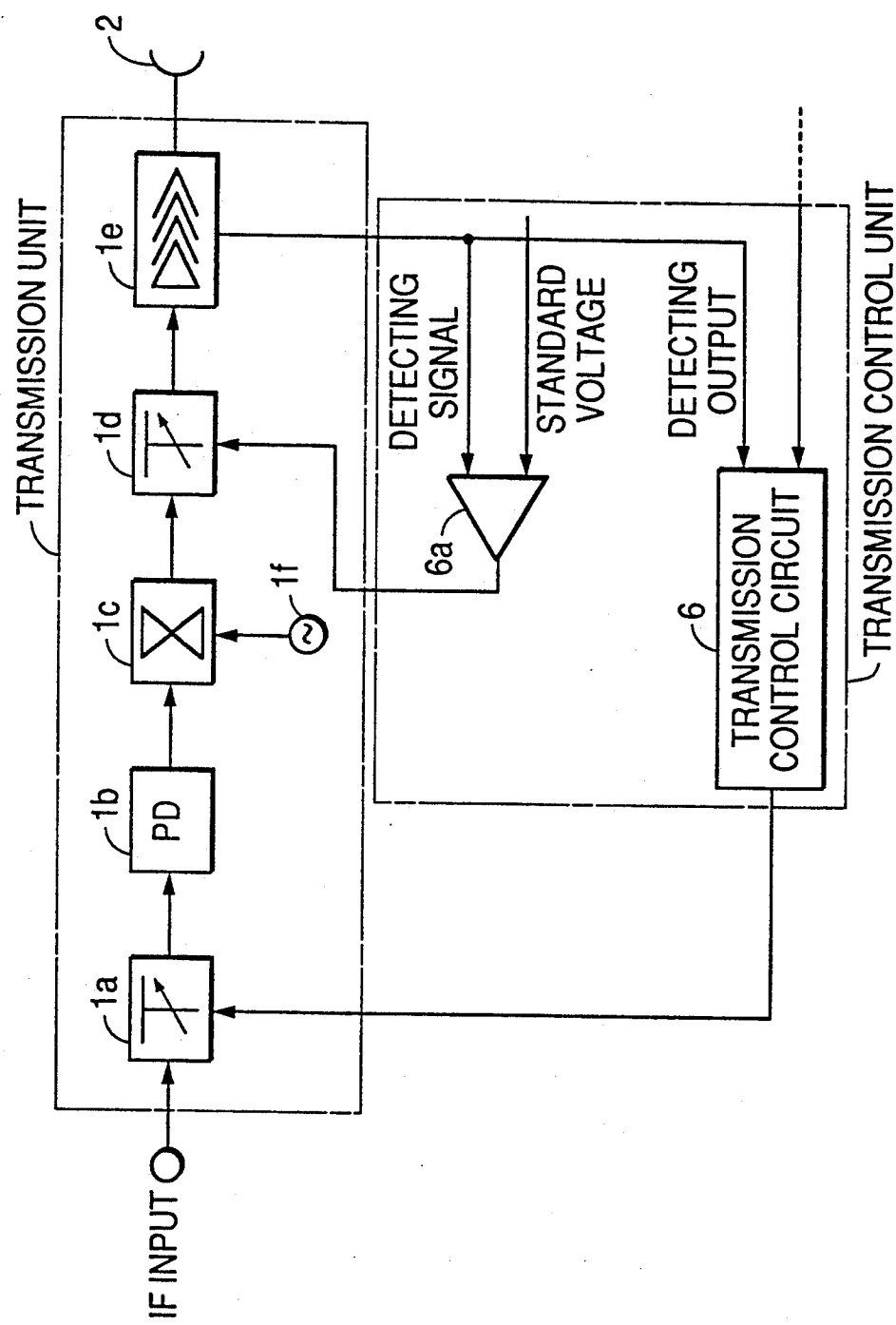
FIG. 3 shows a block diagram of a second prior art transmission power control apparatus.
Figure 6:
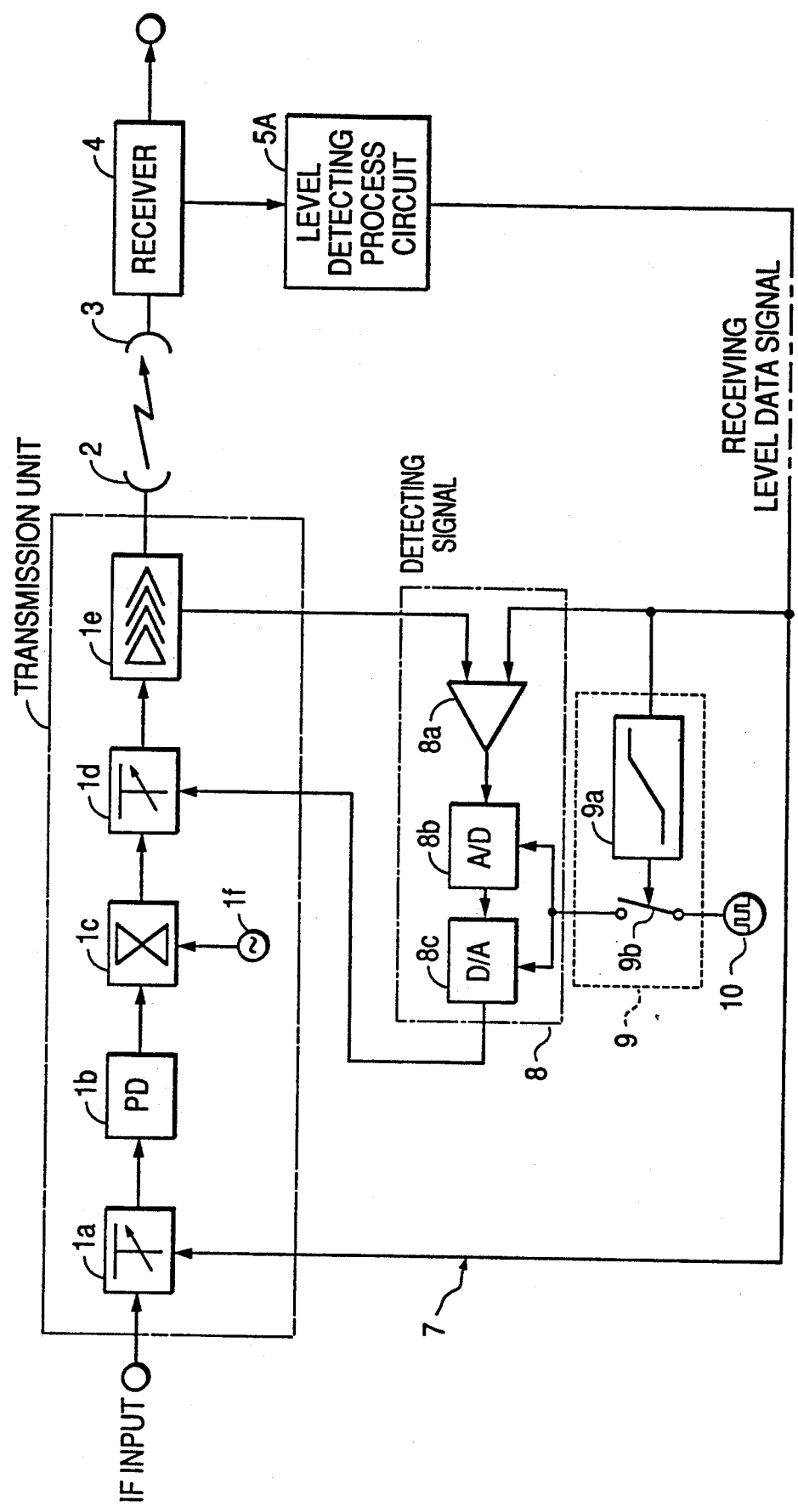
FIG. 6 is a block diagram showing the entire structure of the first embodiment of the present invention.

This embodiment of the present invention will be explained in detail by referring to the drawings. FIG. 6 is a block diagram of the entire structure of the first embodiment. The wireless apparatus or transmission unit of the present embodiment comprises first attenuator $1a$, distortion compensator $1b$, up-converter $1c$, second variable attenuator $1d$, high output amplifier $1e$ and local oscillator $1f$, as in the example shown in FIG. 3. The signal from the transmission unit is transmitted from transmission antenna 2 and is received by the receiving antenna 3 of the receiver 4.

The level detecting process circuit 5A for detecting the receiving level in receiver 4 transmits the receiving level to the transmission side and has the same receiving level clipping function as recited before in FIG. 5. Level detecting process circuit 5A receives the receiving level information from receiver 4 and outputs the receiving level data signal (analog value) clips the receiving level to the first constant value A1 in a scope in which the receiving level is less than the first predetermined value B1, outputs the receiving level data signal (analog value) clipped to the second constant value A2 (>A1) in a scope in which the receiving level is more then the second predetermined value B2(>B1), and further outputs the receiving level data signal (analog value) varying along a continuous line connecting the constant value A1 with the constant value A2 where the receiving level is between the predetermined values B1 and B2.

The transmission side provides the first transmission power control unit 7 for inputting the receiving level data signal obtained from level detecting process circuit 5A as the control voltage to the first variable attenuator 1a, controls variable attenuator 1a to provide the transmission power, and also provides the second transmission power control unit for controlling the second variable attenuator 1d to control the transmission power. The second transmission power control unit comprises comparator 8a, A/D converter 8b and D/A converter 8c. Comparator 8a receives a detection signal having output level information from high output amplifier 1e and a receiving level data signal (analog value) from the level detecting process circuit 5A as the reference signal, and outputs a value representing the difference between the detecting signal and the receiving level data signal to the second variable attenuator 1d as the control voltage, thereby controlling the second variable attenuator 1d.

A/D converter 8b converts an analog signal from comparator 8a to a digital signal, and D/A converter 8c again converts the digital signal from the A/D converter 8b to the analog signal which is outputted to the second variable attenuator 1d. Respective converters 8b and 8c receive a clock signal necessary for the conversion operation through a switch 9b from clock generator 10.

Further, the transmission side of the present embodiment includes switch unit 9 comprising window comparator 9a and switch 9b. Window comparator 9a receives a receiving level signal from level detecting process circuit 5A and determines whether the receiving level data signal is in a range between constant values A1 and A2 (the receiving level is in a range between predetermined values B1 and B2) or whether the receiving level data signal is constant values A1 or A2 (whether the receiving level is less than the predetermined value B1 or more than the predetermined value B2). In the former case, switch 9b is opened (off), and in the latter case, switch 9b is closed (ON).

Accordingly, where the clock signal is transmitted to converters 8b and 8c, and switch 9b is closed, the value of the difference from comparator 8a is transmitted to the second variable attenuator 1d. Thus, the second transmission power control unit 8 performs transmission power control. On the other hand, where switch 9b is opened, the clock signal transmitted to converters 8b and 8c is stopped and then the output of D/A converter 8c is maintained at a constant value. Thus, the transmission power control is performed only by the first transmission power control unit 7.

Figure 7:
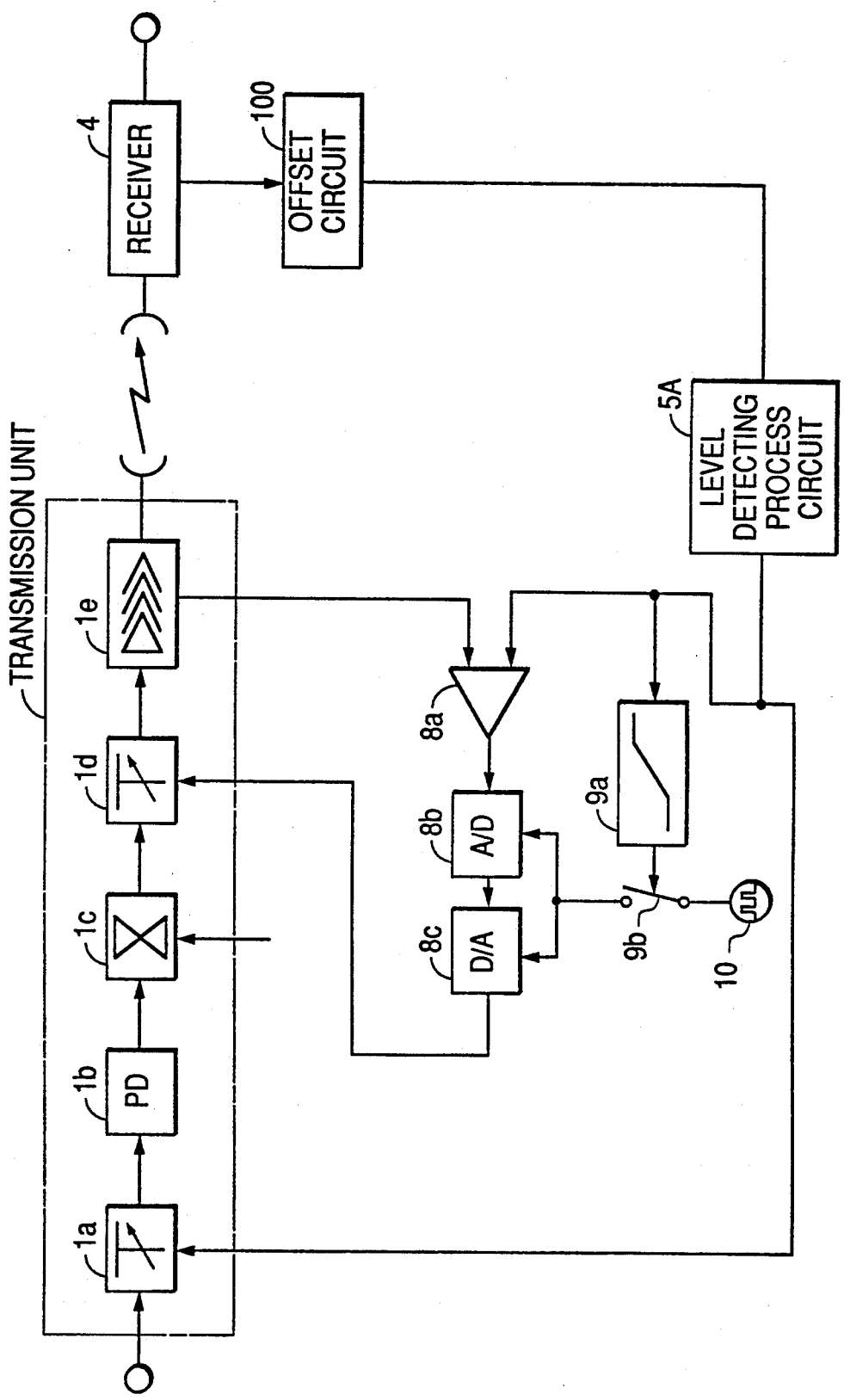
FIG. 7 is a block diagram showing the entire structure of the second embodiment of the present invention.

FIG. 7 is a block diagram showing the entire structure of the second embodiment of the present invention. The embodiment shown in FIG. 7 is the same as the embodiment shown in FIG. 6 except that the level detecting process circuit 5A provided on the receiving side in the first embodiment shown in FIG. 6 is provided at the transmission side, and the offset circuit to which the receiving level input through receiver 4 remains at the receiving side.

Figure 8:
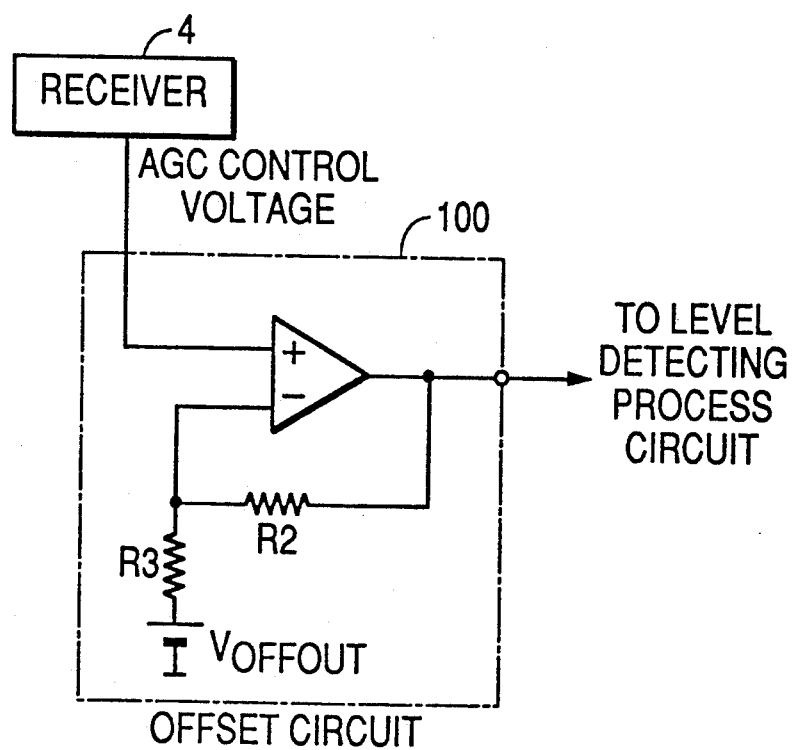
FIG. 8 shows an offset circuit used on the receiving side in the second embodiment shown in FIG. 7.

FIG. 8 shows an embodiment of an offset circuit 10 which remains on the transmission side in FIG. 7. In FIG. 8, offset circuit 100 comprises an operational amplifier for receiving an offset voltage and an AGC (automatic gain control) circuit for controlling voltage from receiver 4, as described later.

Figure 9:
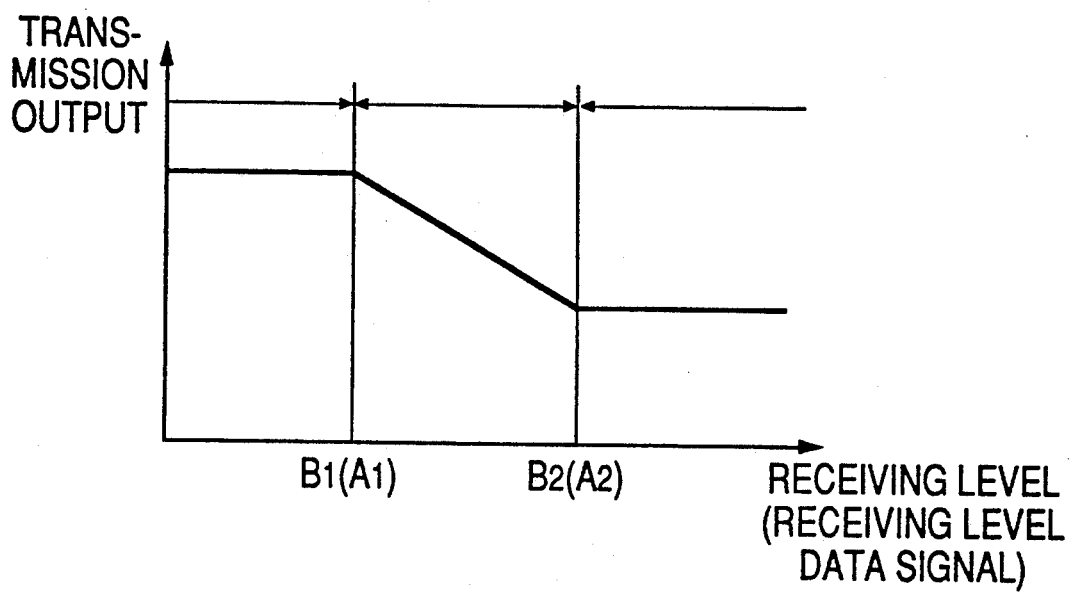
FIG. 9 is a graph for explaining the control scope of the transmission power according to the present invention.

In an embodiment of the power transmission control system constructed as recited above, when the receiving level data signal having receiving level information from receiver 4 and an upper and lower value clipped based on the characteristic shown in FIG. 5 is transferred to the transmission side, a window comparator 9a of switch unit 9 judges whether or not the receiving level data is a constant value A1 or A2 or whether or not it is between constant values A1 and A2. As shown in FIG. 9, the receiving level data signal is divided into a first control range (transmission level control range) determined by the first transmission power control unit 7 and a first variable attenuator 1a, and second control range (ALC auto level control operational range) determined by the comparator 8a and the second variable attenuator 1d. The second control range is called an ALC operation range in the present invention as it is in the prior art because the output of the transmitter unit is maintained as being the determined value, namely, a feedback control system is formed to absorb the gain variation of high-output amplifier 1e. On the other hand, the first control range is called a transmission level control range because the first control range should be distinguished from the ALC operational range.

Where the receiving level data signal is between constant values A1 and A2 (namely, where the receiving level data signal varies along the continuous line connecting the first constant value A1 with the constant value A2), switch 9b is opened by window comparator 9a and the transmission of the clock signal to converters 8b and 8c is stopped. Therefore, immediately previous receiving output (control voltage) from D/A converter unit 8c, is maintained and the control operation by comparator 8a is stopped. Thus, the variation of the gain of high output amplifier 1e is not corrected by the second variable attenuator 1d.

Figure 10:
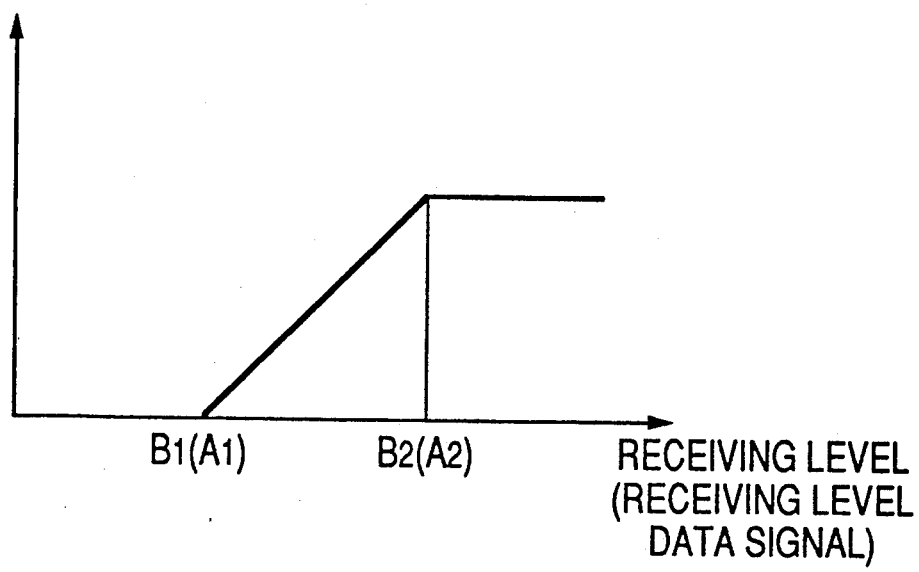
FIG. 10 is a graph for explaining the operation of the first variable attenuator used in the above embodiments of the present invention.

The receiving level data signal output from level detecting process circuit 5A is input to the first variable attenuator 1a as a control voltage, and the attenuation quantity characteristic is adjusted by variable attenuator 1d based on the receiving level data signal as shown in FIG. 10, thereby controlling the transmission power. As shown in FIGS. 9 and 10, in the case of a high receiving level (high receiving level signal), the attenuation quantity of variable attenuator 1a is made large, thereby decreasing the transmission power, while in the case of a lower receiving level (lower receiving data signal) the attenuation amount of variable attenuator 1a is made small, thereby increasing the transmission power.

Where the receiving level signal is clipped constant value A1 or A2, switch 9b is closed by window comparator 9a and the clock signal is transmitted to converters 8b and 8c. Therefore, the analog signal from comparator 8a is converted to the digital signal by the D/A converter 8b and then reconverted to the analog signal by the D/A converter 8c. Then the converted analog signal is outputted to the second attenuator 1d. Thus, the transmission power control is performed by comparator 8a.

Comparator 8a receives a detection signal from high-output amplifier 1e and the receiving level data signal of a constant value A1 or A2 which is clipped by a high-receiving level or low-receiving level. The value of the difference between these signals is output to second variable attenuator 1d as a control voltage, thereby controlling the second variable attenuator 1d and subsequently the transmission power of the transmission unit.

Therefore, a gain variation of high-output amplifier 1e is corrected.

The receiving level data signal input to comparator 8a as a reference signal becomes an analog signal of a constant value A1 or A2 in accordance with the high-receiving level or the lower-receiving level as described above. This constant value is used as a control voltage of the ALC loop. Therefore, the present invention need not provide a reference voltage generator similar to the one in the prior art and then two kinds of ALC operational ranges (the second control ranges) can be provided, thereby achieving an output level of the stable transmission power.

During the period in which the transmission power is controlled by the second variable attenuator 1d, first transmission power control unit 7 receives the receiving level data signal of a constant value A1 or A2, controls the first variable attenuator 1a based on the receiving level data signal and controls the transmission power to provide a constant value in accordance with the receiving data signal.

As described above, according to the transmission power control system of the present embodiment, although the transmission power control system comprises a double loop structure having two variable attenuators 1a and 1d, the two variable attenuators 1a and 1d are independently controlled by first transmission power control unit 7 and comparator 8a, respectively. Control is based on the receiving level data signal having the receiving level information and an upper and lower clipped values. The power transmission control system of the present invention is thus equivalent to a single loop structure, thereby avoiding complicated control, increasing flexibility of design with regard to characteristics of a control system, and realizing assured and highly credible transmission power control.

In the present embodiment, the receiving level data signal which is clipped to a constant value A1 or A2, in accordance with the high receiving level or low receiving level, is used as a control voltage of an ALC loop. Thus, the present invention does not need the reference voltage generator required in the prior art and can determine two kinds of ALC operational ranges. Therefore, the operational level relationship between the distortion compensator 1b and high-output amplifier 1e can be maintained in a good state and stable transmission power of the output level can be achieved.

Figure 11:
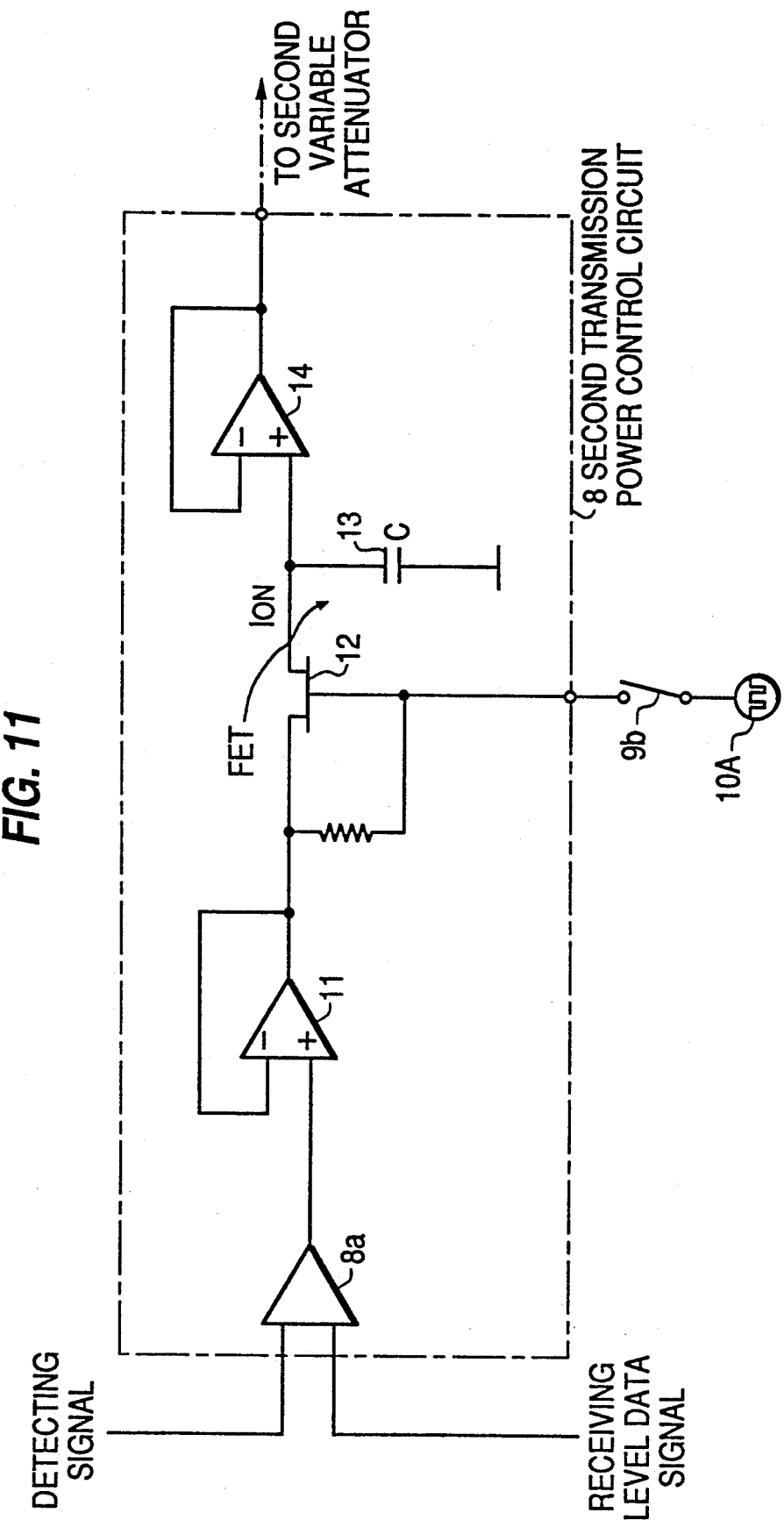
FIG. 11 is a block diagram of another example of the second transmission power control means according to the present invention.

FIG. 11 shows a block diagram of another embodiment of the second transmission power control unit. In FIG. 11, the second transmission power control unit 8 comprises comparator 8a for obtaining the value difference between the detection signal from high-output amplifier 1e and the receiving level data from level detecting process circuit 5A, an operational amplifier to which the output of the comparator 8a is input, field effect transistor (FET) 12 to which the output of an operational amplifier 11 is input, capacitor 13 which is charged when field effect transistor 12 is turned on, and an operational amplifier 14 to which the voltage of capacitor 13 is input.

A combination of A/D converter 8b and D/A converter 8c in FIG. 6 produces a sample hold function realized by a charge stored in capacitor 13 in FIG. 11. When switch 9b is on and sampling pulse generator 10a produces an "L" level output, field effect transistor 12 is turned on and capacitor 13 is charged. When the output of sample hold pulse generator 10a becomes "H", the field effect transistor 12 is turned off, and capacitor 13 falls to the immediately previous voltage and the output voltage of operational amplifier 14 is held at the immediately previous voltage. When switch 9b is open, field effect transistor 12 is turned off and the output of the operational amplifier 14 maintains the immediately previous voltage. Sampling pulse generator 10a is almost identical to clock generator 10 in FIG. 6, but the time interval of the voltage "H" and "L" is different. Thus, the period $T_H$ in which the voltage is high is longer than the period $T_L$ in which the voltage is low.

Figure 12:
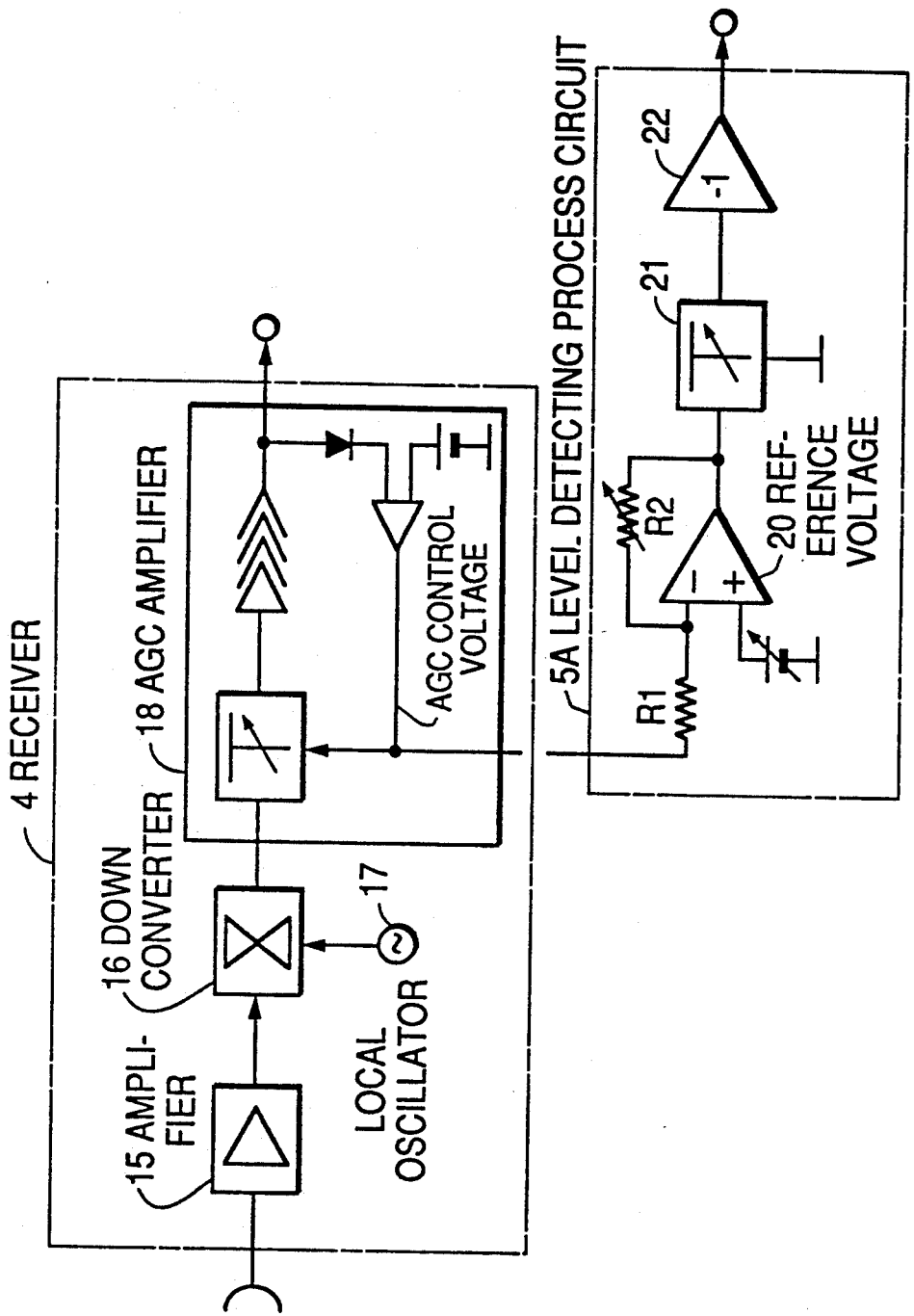
FIG. 12 is a detailed circuit diagram of the level detecting process circuit used in the embodiments of the present invention.

FIG. 12 is a block diagram of an embodiment of the level detecting process circuit. In the same manner as in FIG. 6, level detecting process circuit 5A is provided on the receiving side, but where level detecting process circuit 5A is provided on the transmission side as shown in FIG. 7, offset circuit 10 is inserted between receiver 4 and level detecting process circuit 5A as described above.

In FIG. 12, the receiver 4, comprising amplifier 15 for amplifying the received radio wave, down converter 16 for converting a signal of the high frequency band to the intermediate frequency band, local oscillator 17, and AGC (automatic gain controller) amplifier 18, provides level detecting process circuit 5A with the AGC control voltage. Level detecting process circuit 5A comprises an operational amplifier 20 for amplifying an AGC control voltage input from receiver 4, attenuator 21 for attenuating the output, and phase converter amplifier 22 for reversing the phase of the output from attenuator 21.

Figure 13B:
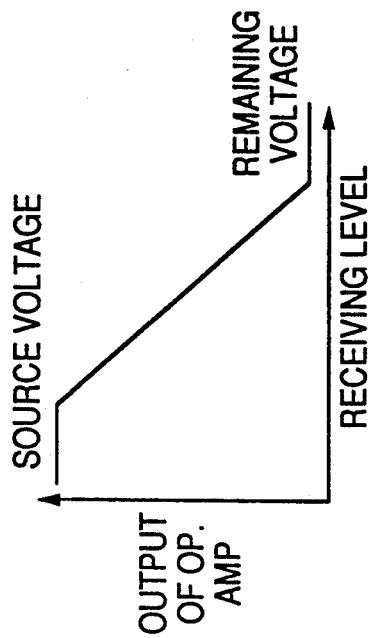
FIGS. 13A, 13B, 13C and 13D are graphs for explaining the operation of the level detecting process circuit according to the present invention.
Figure 13D:
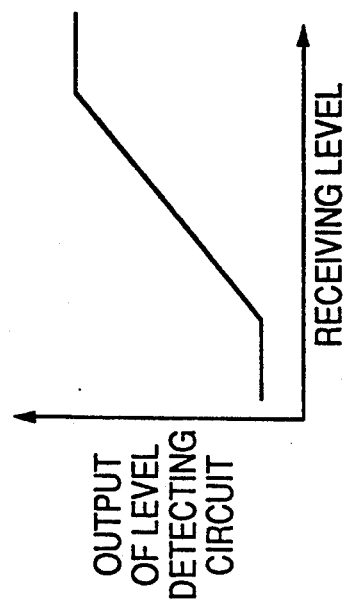
Figure 13A:
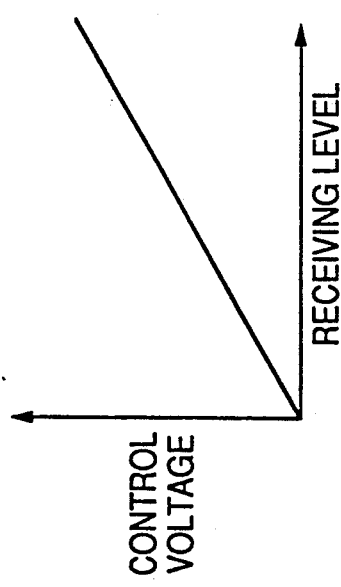
Figure 13C:
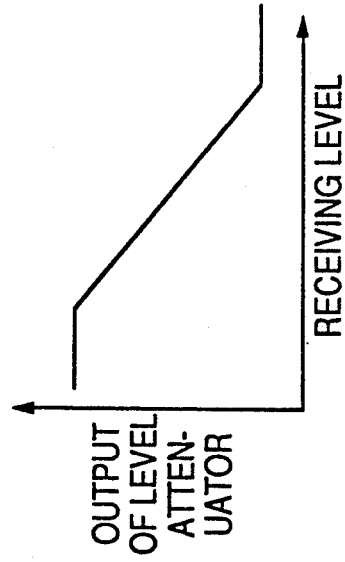

FIGS. 13A to 13B are views for explaining the operation of the embodiment of the level detecting process circuit 5A. In FIG. 13A, the relationship between the AGC control voltage and the receiving level is shown. The AGC control voltage is amplified by the operational amplifier 20, but the output level does not become more than the power source voltage of the operational amplifier. The power source voltage is clipped at a low receiving level. When the receiving level is high, the output does not reduce completely to 0, but reaches a constant value at a certain remaining voltage, as shown in FIG. 13B. The output voltage operational amplifier 20 is subjected to level adjustment by attenuator 21 so that the output voltage of the operational amplifier 20 reaches an effective level as a receiving level data signal. The output of the attenuator 21 is shown in FIG. 13C, and is reversed in phase from the input to the level detecting process circuit 5A. Thus, the output of the attenuator is subjected to a phase inverted by operational amplifier 22 with a gain of $-1$, thereby being outputted as the receiving level data signal as shown in FIG. 13D.

Figure 14A:
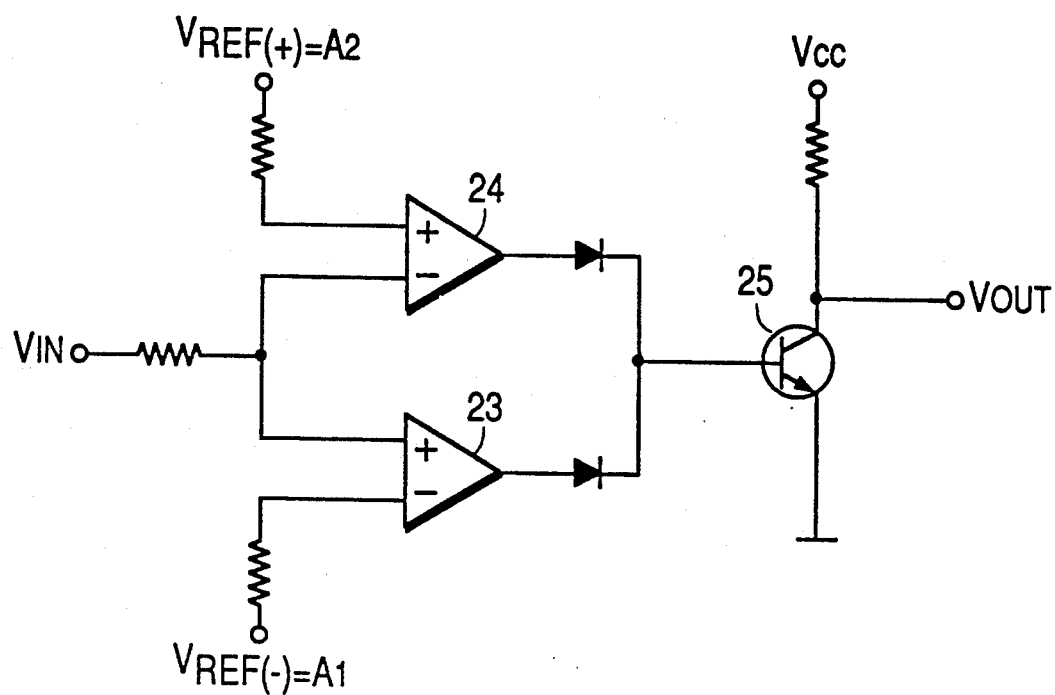
FIG. 14A shows a circuit diagram of a window comparator.
Figure 14B:
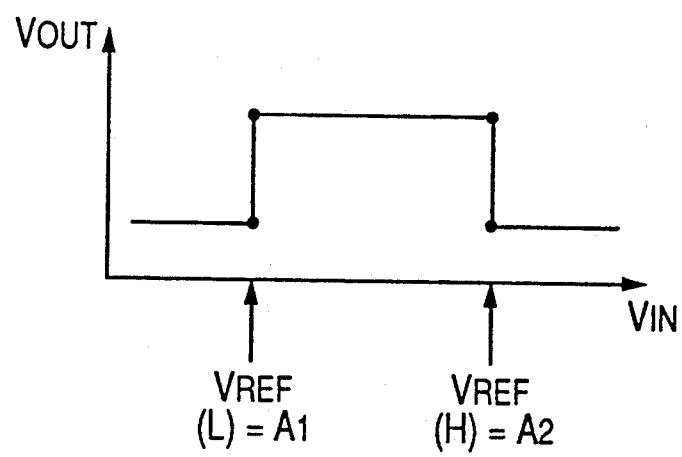
FIG. 14B shows an operational chart of the window comparator.

FIG. 14A shows a circuit diagram of an embodiment of the window comparator 9a shown in FIGS. 6 and 7. FIG. 14B is a view for explaining the operation. In FIG. 14A, window comparator 9a comprises a comparator 23 having a (−) input terminal for receiving the receiving level data signal and a (+) input terminal for receiving a reference voltage $V_{REF}(-)$ complying with a first constant value A1 of the receiving data signal, comparator 24 having a (+) input terminal for receiving the receiving level data signal and a (−) input terminal for receiving a reference voltage $V_{REF}(+)$ complying with the second constant value A2 of the receiving data signal, and NPN transistor 25 having a base to which the output of these comparators are input through respective diodes and providing the collector voltage as the output.

In FIG. 14B, when the input voltage to the window comparator is equal to the reference value complying with the first predetermined value A1 of the receiving level data or is less than the reference value (the latter case correspond to the case in which the receiving level signal is equal to the reference value as the receiving level data signal is clipped to the constant value A1 when the receiving level data signal is lower than the reference value), the output of the comparator 23 is "H" and the output of the comparator 24 is "L". Thus, transistor 25 is driven by a diode on the comparator 23 side and is turned on, thereby enabling the output of the window comparator to be "L". Where the input voltage is equal to the second constant value A2 of the receiving level data signal, the output of comparator 23 is "L", the output of comparator 24 is "H" and thus the transistor 25 is turned on and the output VOUT is "L". In contrast, where the input voltage is between the two reference values, the outputs of both comparators 23 and 24 become "L". Thus, the transistor 25 is turned off, thereby providing the output of "H". Therefore, when a receiving level data signal is between two constant values A1 and A2, switch 9b shown in FIGS. 6 and 7 is turned on. Thus, the clock signal is provided to A/D converter 8b and D/A converter 8c. As described above in detail, the present invention can provide a stable and highly credible transmission power control system and is useful for radio communication utilizing propagation in a free space.

What is claimed is:

1. A transmission power control system for use in a radio apparatus comprising a transmission side including a transmission antenna and a transmission unit provided with a receiving level data signal from a receiver, said transmission unit comprising:
   first variable attenuator means for adjusting an intermediate frequency signal level to generate a first output;
   converter means for converting the first output of said first variable attenuator means to a higher frequency band signal;
   second variable attenuator means for adjusting an output level of the higher frequency band signal, to generate a second output;
   high output amplifier means for amplifying the second output to provide an amplified signal which is output to the transmission antenna, and for generating a detection signal indicating a level of the amplified signal;
   first transmission power control means for controlling transmission power by controlling the degree of attenuation of said first variable attenuator means based on a value of said receiving level data signal;
   second transmission power control means for controlling the transmission power by controlling the degree of attenuation of said second variable attenuator means based on a value of said receiving level data signal and the detection signal; and
   switching means for activating said second transmission power control means to control the transmission power based on whether the receiving level data signal is below a first predetermined value and based on whether the receiving level data signal is above a second predetermined value, the second predetermined value being different than the first predetermined value.

2. The transmission power control system for use in a radio apparatus according to claim 1, wherein a receiving unit of said radio apparatus includes level detecting process circuit means for outputting the receiving level data signal to said transmission side,
   said receiving level data signal being clipped at a first constant value when it is lower than the first predetermined value, being clipped at a second constant value when it is larger than the second predetermined value which is different from said first constant value, and varying along a continuous line connecting said first constant value with said second constant value where said receiving level is between the first predetermined value and the second predetermined value.

3. The transmission power control system for use in a radio apparatus according to claim 1, further comprising:
   a receiving unit including offset circuit means having a non-converted input terminal for receiving an AGC control voltage and an inverting input terminal for receiving an offset voltage; and
   level detecting process circuit means for receiving an output from said offset circuit means and for outputting the receiving level data signal to said transmission side,
   said receiving level data signal being clipped at a first constant value when it is lower than the first predetermined value, being clipped at a second constant value which is different from said first constant value, when it is larger than the second predetermined value which is different from said first predetermined value, and varying along a continuous line connecting said first constant value with said second constant value where said receiving level is between the first predetermined value and the second predetermined value.

4. The transmission power control system in a radio apparatus according to claim 2, wherein
   said first transmission power control means controls the degree of attenuation of said first variable attenuator in accordance with a value of said receiving level data signal when the receiving level data signal transmitted from said level detection process circuit means is in a range in which it varies along a line connecting said first constant value with the second constant value.

5. The transmission power control system for use in a radio apparatus according to claim 2, wherein said second transmission power control means controls the degree of attenuation of said second variable attenuator based on a difference in value between the detection signal having output level information from said high output amplifier and said receiving level data signal when the receiving level data signal transmitted from said level detection process circuit is equal to said first constant value or said second constant value.

6. A transmission power control system for use in a radio apparatus comprising a transmission side including a transmission antenna and a transmission unit provided with a receiving level data signal, said transmission unit comprising:
   first variable attenuator means for adjusting an intermediate frequency signal level;
   converter means for converting the output of said first variable attenuator to a higher frequency band signal;

second variable attenuator means for adjusting the output level of said converter means;

high output amplifier means for amplifying the output of said second variable attenuator to provide an amplified signal which is output to the transmission antenna;

first transmission power control means for controlling transmission power by controlling the degree of attenuation of said first variable attenuator means;

second transmission power control means for controlling the transmission power by controlling the degree of attenuation of said second variable attenuator means; and switching means for activating one of said first transmission power control means and said second transmission power control means in accordance with a range of the receiving level data signal, wherein a receiving unit of said radio apparatus includes level detecting process circuit means for outputting the receiving level data signal to said transmission side, said receiving level data signal being clipped at a first constant value when it is lower than the first predetermined value, being clipped at a second constant value when it is larger than the second predetermined value which is different from said first constant value, and varying along a continuous line connecting said first constant value with said second constant value where said receiving level is between the first predetermined value and the second predetermined value, and said transmission power control system further comprising:

window comparator means for detecting when the receiving level data signal from said level detection process circuit is equal to said first constant value or second constant value, a second switching means outputting a clock signal to said second transmission power control means when said receiving level data signal is equal to one of said constant values.

7. The transmission power control system for use in a radio apparatus according to claim 6, wherein said second transmission power control unit includes comparator means for detecting the difference in value between a detection signal from said high output amplifier means and the receiving level data signal from said level detecting process circuit means, analog/digital converter means for converting the output of said comparator means to a digital signal by using a clock signal output from said second switching means, and digital/analog converter means for converting the output of said analog/digital converter means to an analog signal which is outputted to said second variable attenuator.

8. The transmission power control system for use in a radio apparatus according to claim 6, wherein said second transmission power control means includes comparator means for detecting a difference in value between the detection signal from said high output amplifier and the receiving level data signal from said level detection process circuit, a first operational amplifier for receiving the output of said comparator means, a transistor means for outputting the signal output from said operational amplifier means when the clock signal from said switching means is logic 0, a capacitor means for storing a charge input from said transistor means, and a second operational amplifier for receiving an input from said capacitor.

9. A transmission power control system for use in a radio apparatus comprising a transmission side including a transmission antenna and a transmission unit provided with a receiving level data signal, said transmission unit comprising:

first variable attenuator means for adjusting an intermediate frequency signal level;

converter means for converting the output of said first variable attenuator to a higher frequency band signal;

second variable attenuator means for adjusting the output level of said converter means;

high output amplifier means for amplifying the output of said second variable attenuator to provide an amplified signal which is output to the transmission antenna;

first transmission power control means for controlling transmission power by controlling the degree of attenuation of said first variable attenuator means;

second transmission power control means for controlling the transmission power by controlling the degree of attenuation of said second variable attenuator means; and switching means for activating one of said first transmission power control means and said second transmission power control means in accordance with a range of the receiving level data signal, wherein a receiving unit of said radio apparatus includes level detecting process circuit means for outputting the receiving level data signal to said transmission side, said receiving level data signal being clipped at a first constant value when it is lower than the first predetermined value, being clipped at a second constant value when it is larger than the second predetermined value which is different from said first constant value, and varying along a continuous line connecting said first constant value with said second constant value where said receiving level is between the first predetermined value and the second predetermined value, and said level detecting process circuit means including means for amplifying an AGC control voltage and clipping maximum output voltage by a source voltage, attenuator means for decreasing the output of said amplifier means and for clipping the maximum output value and the minimum output value, and an amplifier for performing a phase conversion of the output of said attenuator means.

10. The transmission power control system for use in a radio apparatus according to claim 6, wherein said window comparator comprises:

a first comparator for outputting logic 0 when said receiving level data signal value is larger than said first constant value and for producing logic 1 when said receiving data signal value and said first constant value are equal to each other, a second comparator for producing logic 0 when said receiving level data signal value is less than said second constant value and for producing logic 1 when both said receiving level data signal value and said second constant value are equal to each other, and transistor means for receiving the output of said first and second comparators and for producing an output signal from a collector of said transistor means.

11. A method for controlling transmission power of a radio apparatus supplied with an intermediate frequency signal, comprising the steps of:

a) attenuating a level of the intermediate frequency signal;
b) converting the intermediate frequency signal attenuated in said step (a) into a higher frequency signal;
c) attenuating a level of the higher frequency signal;
d) amplifying the higher frequency signal attenuated in said step (c) to provide a transmission signal;
e) generating a detecting signal based on the transmission signal;
f) transmitting the transmission signal;
g) receiving the transmission signal;
h) generating a receiving level data signal based on the transmission signal received in said step (g);
i) controlling the attenuating of said step (a) based on the receiving level data signal when a level of the receiving level data signal is between first and second predetermined values, the second predetermined value being greater than the first predetermined value; and
j) controlling the attenuating of said step (c) based on the detecting signal and the receiving level data signal when the level of the receiving level data signal is equal to or below the first predetermined value and equal to or above the second predetermined value.

* * * * *